United States Patent

[11] 3,568,091

[72] Inventor Charles H. Rahe, II
Lancaster, Pa.
[21] Appl. No. 802,571
[22] Filed Feb. 26, 1969
[45] Patented Mar. 2, 1971
[73] Assignee Hamilton Watch Company
Lancaster, Pa.

[54] ASTABLE MULTIVIBRATOR USING TWO COMPLEMENTARY TRANSISTOR PAIRS

18 Claims, 9 Drawing Figs.

[52] U.S. Cl. .......... 331/113, 331/116
[51] Int. Cl. .......... H03b 5/36, H03k 3/282
[50] Field of Search .......... 331/113, 116, 111, 108 (A)

[56] References Cited
UNITED STATES PATENTS
3,268,738 8/1966 Deavenport .......... 331/113X
3,434,051 3/1969 Hewhoff .......... 331/113X
3,469,210 9/1969 Freeman .......... 331/113
OTHER REFERENCES
Feldman et al., Electronics, Apr. 12, 1963, pp. 80, 82 (331-113)

*Primary Examiner*—John Kominski
*Assistant Examiner*—Siegfried H. Grimm
*Attorney*—Le Blanc & Shur ABSTRACT: Disclosed is a multivibrator for use as a time standard in a wristwatch or other small timepiece. The multivibrator comprises a pair of inverters each including complementary insulated gate field effect transistors. When one transistor in an inverter switches on the other switches off, thus minimizing power drain. A simplified single timing circuit controls the multivibrator half periods and the multivibrator may be synchronized with the natural frequency or some subharmonic of a quartz crystal.

ASTABLE MULTIVIBRATOR SCHEMATIC DIAGRAM

INVERTER TRANSFER CHARACTERISTIC

INVERTER SCHEMATIC DIAGRAM

ASTABLE MULTIVIBRATOR WAVEFORMS

INVENTOR
CHARLES H. RAHE II
BY
LeBlanc & Shur
ATTORNEYS

ASTABLE MULTIVIBRATOR USING TWO COMPLEMENTARY TRANSISTOR PAIRS

This invention relates to multivibrators and more particularly to an astable or free-running multivibrator of simplified construction and one that requires a minimum of power to operate it. In a preferred embodiment, the multivibrator takes the form of a pair of inverters, each comprising complementary transistors particularly adapted for use in integrated circuits. The multivibrator is particularly suited for use as a time standard in a small timepiece or watch where limited power is available to operate the multivibrator oscillator.

Battery-powered wristwatches and other small portable timekeeping devices are well known and commercially available. One such device which has proven to be quite successful commercially is shown and described in assignee's U.S. Re Pat. No. 26,187, reissued Apr. 4, 1967, to John A. Van Horn et al. for ELECTRIC WATCH. Electric watches of this type employ a balance wheel and a hairspring driven by the interaction of a current-carrying coil and a magnetic field produced by small permanent magnets. Other types of mechanically regulated battery-operated wristwatches are also known.

Considerable effort has been directed toward the development of high accuracy wristwatches which do not employ electromechanical oscillators as the master speed reference. One approach which has been considered and has been subjected to substantial investigation is the use of completely electronic circuitry to generate a master drive signal for the time display. However, difficulties have been encountered in implementing such constructions, including the difficulty of providing a suitable oscillator of realistic size and power dissipation for use in a wristwatch where the power available is limited by the small size of the battery. The present invention is directed to the provision of an oscillator and more specifically an astable multivibrator which overcomes these difficulties in providing a very stable oscillator of small size and low power dissipation, particularly adapted for use in a wristwatch and other small portable timepieces. The oscillator of the present invention is particularly adapted for use in an electronic watch of the type shown and described in assignee's copending application U.S. Ser. No. 768,076, filed Oct. 16, 1968, which application is incorporated herein by reference.

In the preferred embodiment, the oscillator of the present invention comprises a pair of complementary inverters which may be interconnected to each other with a single timing circuit simply comprising a resistor, a capacitor, and a power supply. This makes possible a simplified and inexpensive astable or free-running multivibrator particularly adapted for integrated circuit fabrication so as to have small size and weight, while at the same time evidencing good stability and low power consumption. Each complementary inverter comprises two semiconductors of opposite polarities connected so that when the input to the inverter is at a high level, the output is at a low level, and when the input is low, the output is high. In the preferred embodiment, the semiconductors take the form of complementary metal oxide silicon field effect transistors (MOSFETs) but it is also possible to construct the device using complementary bipolar transistors.

Other important features of the present invention include the provision in the multivibrator of a simplified timing circuit including rectifier diodes which make it possible to independently control the on and off times of the multivibrator oscillator. By the incorporation of a crystal in a feedback circuit of the oscillator, it is possible to synchronize the oscillator to the crystal frequency or to some subharmonic of the crystal, thus making possible a wide range of accurately controlled operating frequencies.

It is therefore one object of the present invention to provide an improved frequency or timing standard, particularly suited for wristwatches and other timepieces.

Another object of the present invention is to provide an improved semiconductor astable multivibrator.

Another object of the present invention is to provide an oscillator of small size and weight particularly adapted for integrated circuit fabrication and one which has good stability and low power consumption.

Another object of the present invention is to provide an astable multivibrator requiring only a single simplified timing circuit.

Another object of the present invention is to provide a multivibrator incorporating a pair of inverters comprising complementary transistors in conjunction with a simplified timing circuit.

Another object of the present invention is to provide a solid state astable multivibrator in which the on and off times of the multivibrator may be independently controlled. Another object of the present invention is to provide a crystal-controlled multivibrator synchronized to the crystal frequency or to some subharmonic of the crystal.

Another object of the present invention is to provide an astable multivibrator comprising two pairs of complementary metal oxide silicon field effect transistors particularly suited for use in integrated circuits.

These and further objects and advantages of the present invention will be more apparent upon reference to the following specification, claims, and appended drawings, wherein:

Figure 1:
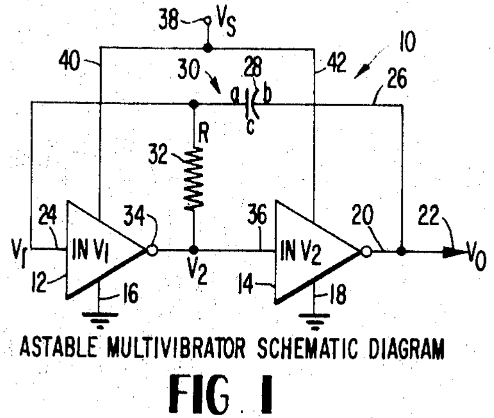
FIG. 1 is a simplified circuit diagram of an astable multivibrator constructed in accordance with the present invention.

Referring to the drawings, the novel astable multivibrator of the present invention is generally indicated at 10 in FIG. 1. The multivibrator comprises a pair of inverters 12 and 14 connected to system ground as at 16 and 18. The output from the multivibrator 10 is by way of lead 20 to output terminal 22 labeled $V_0$.

Output lead 20 is connected to the input 24 of the first inverter 12 labeled $V_1$ by lead 26 through a capacitor 28 labeled C and forming one element of a simplified timing circuit generally indicated at 30. Timing circuit 30 comprises the capacitor 28 and a resistor 32 connected between one side of capacitor 28 and the output 34 of the first inverter 12 labeled $V_2$. Output terminal 34 of inverter 12 is connected to the input 36 of the second inverter 14. The input signal at 22 is taken from the output terminal 20 of the second inverter. A suitable power supply (not shown), such as a wristwatch battery, has its negative side connected to ground and its positive side connected to the positive power supply terminal 38 labeled $V_B$ supplying power to the inverters 12 and 14 by way of leads 40 and 42.

Figure 2:
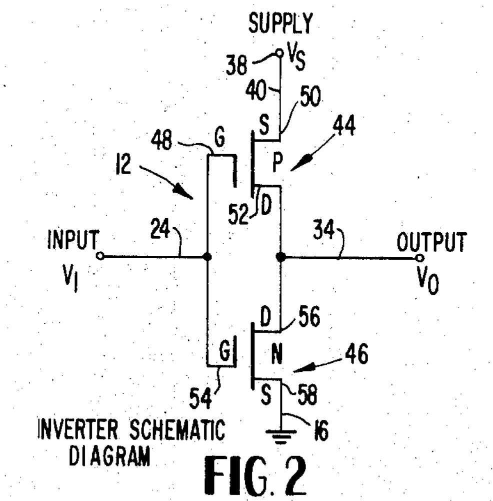
FIG. 2 is a circuit diagram of one of the inverters of FIG. 1.

FIG. 2 is a circuit diagram of the first inverter 12 and like parts bear like reference numerals. It is understood that the second inverter 14 of identical construction and only the inverter 12 will be described in detail. Inverter 12 comprises a pair of transistors 44 and 46, each preferably taking the form of a metal oxide silicon field effect transistor or MOSFET. Transistor 44 is a P-channel MOSFET operated in the depletion mode and comprising a gate 48, source 50 and drain 52.

Transistor 46 is a complementary N-channel MOSFET operated in the enhancement mode and includes gate 54, rail 56 and source 58. Not shown are the second gate or substrate connections for the transistors. In P-channel transistor 44, the substrate connection is to the positive supply terminal 38, while for the N-channel transistor 46, the substrate connection is made to ground 16. The two transistor gates 48 and 54 are connected to the input terminal 24 and the two drains 52 and 56 are connected to the inverter output terminal 34. Source 50 of transistor 44 is connected to the positive power supply terminal 38 and the source 58 of transistor 46 is connected to ground 16.

Figure 3:
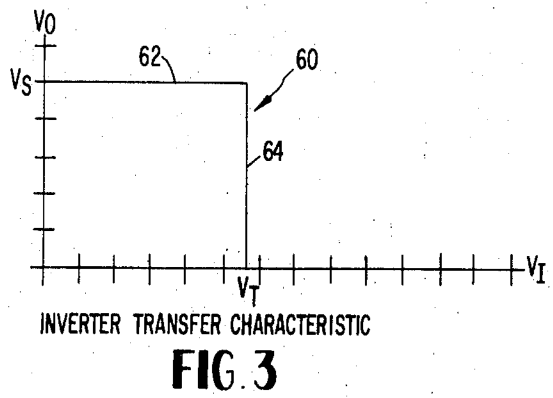
FIG. 3 is a plot of the transfer characteristics of the inverter of FIG. 2.

FIG. 3 is a plot of the transfer characteristics of inverter 12 of FIG. 2 with output voltage $V_o$ plotted as a function of input voltage $V_1$ to the inverter. It can be seen that the inverter transfer characteristic indicated by line 60 in FIG. 3 has a substantial flat top 62 which sharply falls off at 64. That is, when the input voltage $V_1$ is below the critical threshold voltage $V_t$ for the inverter, the output voltage $V_o$ is at the level of the power supply $V_s$ as indicated by the flat portion 62 of the transfer characteristic 60 in FIG. 3. When the input voltage exceeds the threshold voltage $V_t$, the output voltage $V_o$ drops sharply as indicated at 64 from the positive power supply level $V_s$ to substantially zero or ground.

Figure 4:
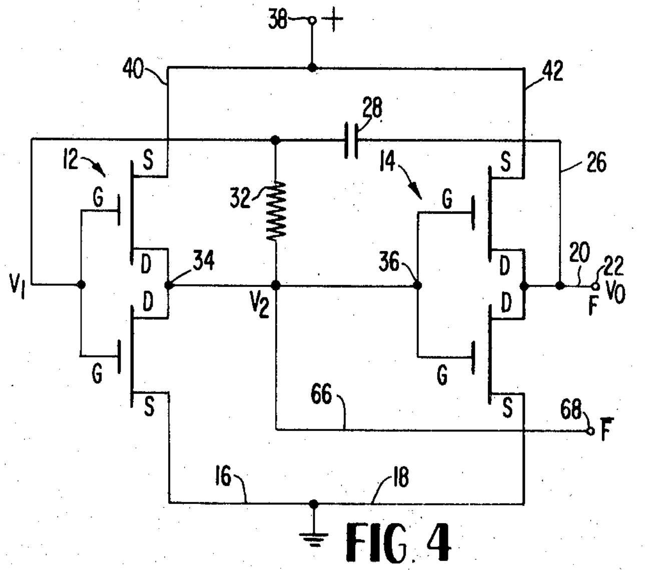
FIG. 4 is a detailed circuit diagram of the astable multivibrator of FIG. 1.

FIG. 4 is a detailed circuit diagram of the multivibrator shown generally in FIG. 1. In FIG. 4, like parts bear like reference numerals and, as previously stated, the inverter 14 is in all respects identical to the inverter 12 described in detail in conjunction with FIG. 2. In FIG. 4, the output taken from the multivibrator at output terminal 22 is labeled F. A complementary output F may be taken from the output terminal 34 of inverter 12 by way of lead 66 and complementary output terminal 68.

Figure 5:
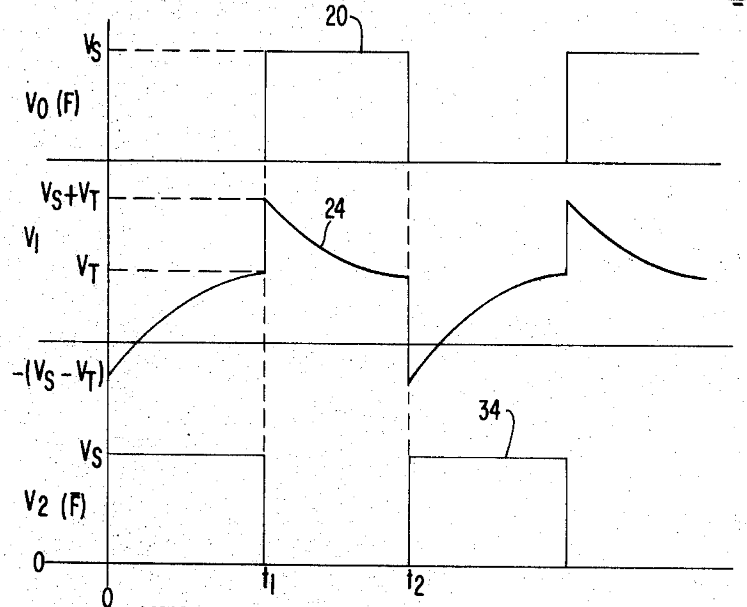
FIG. 5 is a plot of the voltage waveforms for the multivibrator of FIG. 4.

FIG. 5 is a waveform diagram showing the voltage waveforms appearing at various locations in the circuit of FIG. 1. The first waveform is the output voltage $V_0$ (or F in FIG. 4) appearing at output terminal 22 and at the output 20 of the second inverter. This waveform is labeled 20 in FIG. 5 to indicate that it appears on lead 20 in FIG. 1. The second waveform 24 in FIG. 5 is labeled $V_1$ and this is the waveform at the input terminal 24 to the first inverter 12 in FIG. 1. The maximum excursion of the waveform 24 is between a value $-(V_s - V_t)$ to $+(V_s + V_t)$ where $V_s$ is the battery voltage and $V_t$ is the threshold voltage for one of the inverter transistors. The third waveform in FIG. 5 labeled $V_2$ (corresponding to $\bar{F}$ in FIG. 4) is the voltage appearing at the output terminal 34 of the first inverter 12 of FIG. 1 and it is so labeled in FIG. 5. As can be seen, the waveform 20 representing the output voltage $V_o$ in FIG. 5 is substantially a square wave which varies between the battery voltage level and ground. The voltage $V_2$ is a complement to the output voltage $V_o$ and likewise varies between ground and the battery voltage $V_s$.

The operation of the circuit will be described in conjunction with the simplified circuit diagram of FIG. 1 and reference may be had to the waveforms of FIG. 5 for a better understanding of the operation of the multivibrator of the present invention. When the input voltage $V_1$ at input terminal 24 to the first inverter 12 is above the threshold voltage $V_t$, the N-channel transistor 46 in FIG. 2 of inverter 12 is fully turned on or saturated while the P-channel transistor 44 is cut off. Thus, the output terminal 34 of inverter 12 is "shorted" to ground through the N-channel transistor 46 which is in the conducting saturated state. When the input voltage $V_1$ is below the threshold voltage $V_t$, the P-channel transistor 44 is saturated and the N-channel transistor 46 is cut off. In this case, the output terminal 34 is shorted "shorted" to the supply voltage at supply terminal 38 through the P-channel transistor 44.

In an inverter configuration of this type, one or the other of the two transistors of each inverter is cut off except during the very brief period of time when the inverter is switching states. Because of this, the quiescent current through the inverter is limited to the leakage current of the cutoff transistor which is very small. Therefore, the only power consumption is due to the leakage plus that due to the switching and the current required to charge the capacitances of the circuit. All of these are minimized by the circuit of the present invention and thus the circuit operates with an extremely low power drain.

Assuming initially that the output voltage $V_2$ at output terminal 34 of the first inverter 12 is in a high state ($V_2 = V_s$) and the output $V_o$ at output terminal 20 of the second inverter 14 is in the low state ($V_o$ = zero), then the steps of operation of the multivibrator of FIG. 1 are as follows:

1. Capacitor 28 labeled C charges through the P-channel transistor 44 of inverter 12 and through resistor 32 labeled R such that side *a* of capacitor 28 is positive.

2. The input voltage $V_1$ at input terminal 24 of inverter 12 rises with the voltage on capacitor 28 until it reaches the threshold voltage $V_t$.

3. Inverter 12 then switches states as $V_1$ passes through $V_t$ and its output $V_2$ drops to zero or to ground.

4. The input terminal 36 of the second inverter 14 is now below the threshold voltage $V_t$ and its output voltage $V_o$ switches to the saturation value $V_s$.

5. Since the voltage across capacitor 28 cannot change instantaneously, $V_1$ is carried to $V_s + V_t$ as illustrated in FIG. 5 insuring that the output $V_2$ of inverter 12 is in its lowest state and causing a regenerative action through the circuit.

6. Capacitor 28 then discharges through resistor 32 and the N-channel transistor 46 of inverter 12 until $V_1$ equals $V_s$ and recharges through the P-channel transistor 44 in inverter 14 with the side *b* of the capacitor positive until the voltage $V_1$ falls to $V_t$, at which time the voltage across capacitor 28 equals $V_s - V_t$.

7. As the input voltage $V_1$ falls through $V_t$, inverter 12 switches back to a high output state so that $V_2$ equals $V_s$.

8. Inverter 14 switches to the low state, i.e., $V_0$ equals zero.

9. Again the voltage on capacitor 28 cannot change instantaneously and the input voltage $V_1$ is driven to $-(V_s - V_t)$ causing regeneration through the circuit.

10. Capacitor 28 again charges through the P-channel transistor 44 in inverter 12 and through resistor 32 until the input voltage voltage $V_1$ reaches the threshold voltage $V_t$ when the entire cycle repeats itself.

A simplified analysis of the circuit yields the following approximate equation for the oscillation periods:

$$t_1 = RC\ ln\left(\frac{(2V_S - V_T)}{(V_S - V_T)}\right) \quad (1)$$

$$t_2 - t_1 = RC\ ln\left(\frac{(V_S + V_T)}{(V_T)}\right) \quad (2)$$

Adding the two periods gives the total period of oscillation $$T_o = RC\ ln\left(\frac{(2V_S - V_T)}{(V_S - V_T)}\,\frac{(V_S + V_T)}{(V_T)}\right) \quad (3)$$

from which the frequency of operation $f_o$ can be computed by:

$$f_o = \frac{1}{T_o} \quad (4)$$

Figure 6:
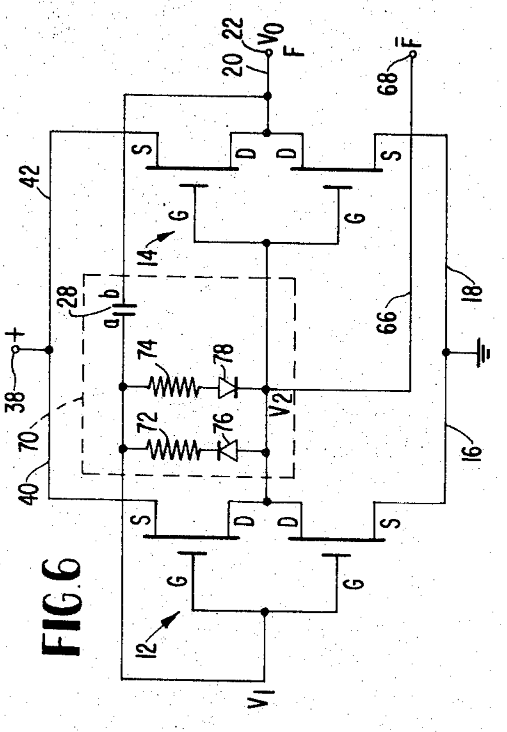
FIG. 6 is a circuit diagram of a modified multivibrator incorporating a timing circuit for independently modifying the on and off times of the multivibrator.

FIG. 6 is a detailed circuit diagram of a modified multivibrator $V_i$n accordance with the present invention which makes it possible to independently vary the half periods, i.e., $t_1$ and $t_2 - t_1$ illustrated in FIG. 5. The circuit of FIG. 6 is similar to the circuit of FIG. 4 and like parts bear like reference numerals. The principal difference in the circuit of FIG. 6 is that it incorporates a modified timing generally indicated by the dashed box 70 in FIG. 6 which timing circuit includes as one element the previously described capacitor 28. In addition to the capacitor, the timing circuit comprises a pair of resistors 72 and 74, each connected in series with a rectifier diode 76 and 78 between the input and the output of the first inverter 12. That is, in FIG. 6 the resistor 32 of FIGS. 1 and 4 is replaced by the parallel resistor-diode combinations of FIG. 6. As illustrated, diode 76 is poled in an opposite direction to diode 78.

The independent control of the half periods of oscillation results from the switching action of the diodes 76 and 78 as follows:

1. When the multivibrator output voltage $V_0$ at output terminal 22 is low, the output voltage of the first inverter 12, i.e., $V_2$, is high and diode 78 is reverse biased, prohibiting current flow through its resistor 74. However, diode 76 is forward biased and current can flow through its resistor 72 to charge capacitor 28 with side *a* positive. Resistor 72 thus controls the charging rate of capacitor 28 and determines the first half period $t_1$ as shown in the equation.

$$t_1=R_1C\ln\left(\frac{2V_S-V_T}{V_S-V_T}\right) \quad (5)$$

2. After the inverters switch, the output voltage $V_0$ is high and the voltage $V_2$ is low. Under these conditions, diode 76 is reverse biased and diode 78 is forward biased. Diode 78 now controls the discharge and recharge time of capacitor 28 and determines the second half period, i.e., $t_2-t_1$, as shown by the following equation:

$$t_2-t_1=R_2C\ln\left(\frac{V_S+V_T}{V_T}\right) \quad (6)$$

The total period of oscillation is given by:

$$T_o=R_1C\ln\left(\frac{2V_S-V_T}{V_S-V_T}\right)+R_2C\ln\left(\frac{V_S+V_T}{V_T}\right) \quad (7)$$

Figure 7:
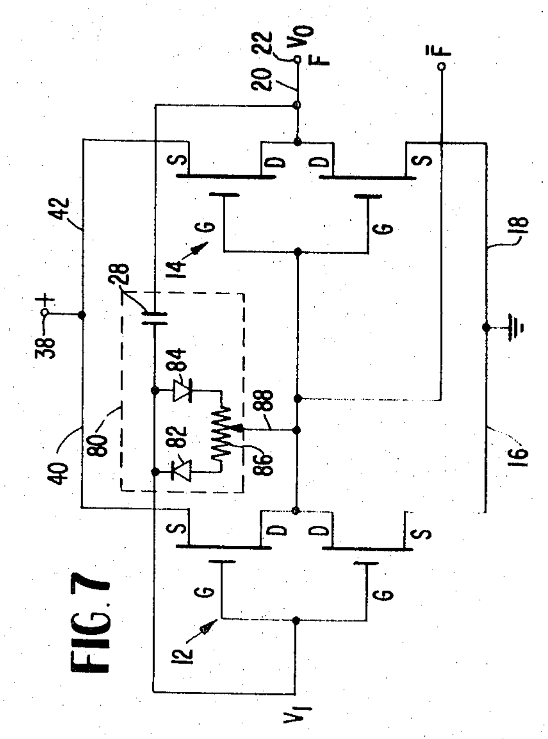
FIG. 7 is a circuit diagram, similar to that of FIG. 6, showing a further modified timing circuit for independent variation of the on and off times of the multivibrator.

FIG. 7 shows a modification of the circuit of FIG. 6 with like parts again bearing like reference numerals. In the circuit of FIG. 7, the half periods are controlled by the timing circuit generally indicated by the dashed lines 80, again including as one element the capacitor 28. In this embodiment, oppositely poled rectifier diodes 82 and 84 are connected in series with the resistance of a potentiometer 86 having a manually adjustable wiper arm 88. This circuit operates in a manner similar to the circuit of FIG. 6 as previously described and further description is not believed necessary. The equations for the circuit of FIG. 7 are as follows:

$$t_1=(1-k)RC\ln\left(\frac{2V_S-V_T}{V_S-V_T}\right) \quad (8)$$

$$t_2-t_1=KRC\ln\left(\frac{V_S+V_T}{V_T}\right) \quad (9)$$

$$T_o=RC\left[(1-K)\ln\left(\frac{2V_S-V_T}{V_S-V_T}\right)+K\ln\left(\frac{V_S+V_T}{V_T}\right)\right. \quad (10)$$

It is apparent that by adjusting the position of the wiper arm 88 along its resistance 86, the length of the two half periods may be varied with respect to each other.

Figure 8:
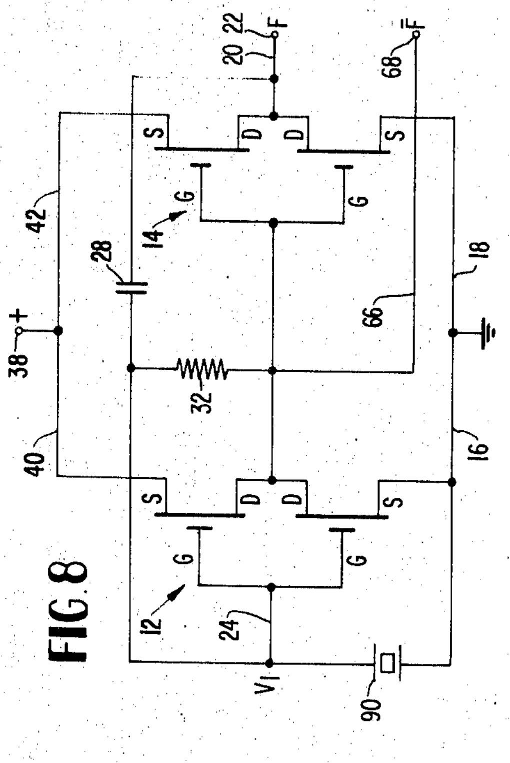
FIG. 8 is a circuit diagram of a crystal controlled multivibrator constructed in accordance with the present invention.

FIG. 8 shows a further modification in which the multivibrator of the present invention is crystal controlled. The circuit of FIG. 8 is similar to that of FIGS. 1 and 4 and like parts bear like reference numerals. The difference in this circuit from that of FIG. 4 is that a frequency controlling quartz crystal 90 is connected between the input terminal 24 of the first inverter 12 and ground lead 16. In FIG. 8, if the free running period of the multivibrator is adjusted through suitable selection of capacitor 28 and resistor 32 to be slightly greater than the natural period of the quartz crystal 90, then the output voltage at output terminal 22 or its complementary terminal 68 is synchronized with and controlled by oscillator 90. When power is applied to the circuit of FIG. 8, the following action takes place:

1. The astable multivibrator will start to oscillate at its free-running period.
2. The electrical signal $V_1$ at the input to inverter 12 excites the quartz crystal 90 causing it to vibrate mechanically at its natural resonant frequency.

3. The mechanical vibrations of the quartz crystal generate an alternating voltage with a frequency equal to the resonant frequency of the crystal and this voltage appears at the crystal terminals.
4. Because of the connection of the crystal with the multivibrator, the crystal generated voltage is superimposed on the input voltage $V_1$.
5. By proper selection of components, the additional voltage resulting from the crystal is sufficient to raise the input voltage $V_1$ above or drop it below the transistor voltage $V_T$ for the inverter, depending upon the state of the inverter 12. It causes the inverter 12 to change state slightly before the free-running time and acts to synchronize the multivibrator to the crystal frequency.

With the circuit of FIG. 8, it is possible to synchronize the multivibrator at the fundamental and also at some subharmonic of the crystal frequency. A subharmonic is related to the fundamental frequency by the following expression:

$$f_{sn}=\frac{f_o}{n} \quad (11)$$

where $f_{sn}$ equals the nth subharmonic, $f_o$ equals the fundamental crystal resonant frequency, and n is an integer number, i.e., 1, 2, 3, etc. Thus, it is possible to obtain precise and stable frequencies in a range not generally compatible to crystal control due to the cost, size and stability problems with low-frequency crystals and without the added complexity of divider stages.

Figure 9:
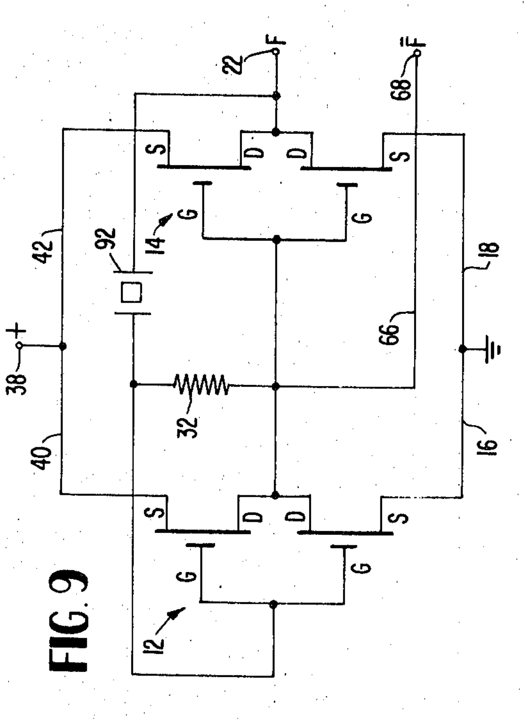
FIG. 9 is a circuit diagram of a modified crystal-controlled multivibrator constructed in accordance with the present invention.

FIG. 9 shows a modified crystal controlled embodiment of the multivibrator of the present invention which is obtained by inserting a quartz frequency-controlling crystal 92 in the feedback circuit from the output of the second inverter 14 to the input of the first inverter 12. That is, in FIG. 9, quartz crystal 92 is substituted for the capacitor 28 of FIGS. 1 and 4. In this case, the inter electrode capacity of the quartz 92 serves as the feedback capacitance and the voltage developed across it excites the crystal and synchronizes the multivibrator with the fundamental frequency or with some subharmonic of the crystal as previously described.

It is apparent from the above that the present invention provides an improved frequency or time standard and particularly an improved time standard adapted for use in wristwatches and other small portable timepieces. The multivibrator of the present invention is particularly suited for integrated circuit application to give very small size and lightweight. While described in conjunction with complementary MOSFET semiconductor devices, the circuits of the present invention may also be constructed utilizing complementary bipolar transistors. In all instances, the circuit includes a simplified single timing circuit, in the most simple case comprising a single resistor and capacitor. Provision is incorporated for independently varying the half periods of the multivibrator output where desired. Important features of the present invention include vary low power consumption, a substantially square wave output, full power supply output swing, a wide range of operation, and a minimum number of components. The multivibrator may be readily synchronized to a suitable synchronizing source such as a quartz crystal to give a precise and stable output frequency at either the natural frequency of the crystal or at some crystal subharomonic.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. A multivibrator comprising first and second inverters, each of said inverters comprising a pair of complementary transistors, means coupling the output of said first inverter to the input of said second inverter, a capacitor coupling the output of said second inverter to the input of said first inverter, a resistor coupled between the input and the output of said first inverter, and means for deriving a multivibrator output from one of said inverters.

2. A multivibrator according to claim 1 wherein said transistors are each insulated gate field effect transistors.

3. A multivibrator according to claim 1 wherein each of said inverters comprises a P-channel insulated gate field effect transistor and an N-channel insulated gate field effect transistor.

4. A multivibrator according to claim 3 including means coupled to said inverters for operating each of said P-channel transistors in the depletion mode and each of said N-channel transistors in the enhancement mode.

5. A multivibrator comprising first and second inverters, each of said inverters comprising a pair of complementary transistors having commonly connected input electrodes whereby one transistor switches off when the other transistor switches on in response to an input signal to said commonly connected electrodes, means for coupling the remaining electrodes of the transistors of each of said inverters in series across a power supply, a single timing circuit for said multivibrator, said timing circuit comprising a capacitor coupling the output of said second inverter to the input of said first inverter and a resistor coupled between the input and the output of said first inverter, and means for deriving a multivibrator output from one of said inverters.

6. A multivibrator according to claim 5 wherein said transistors are insulated gate field effect transistors having their gate electrodes connected in common.

7. A multivibrator according to claim 6 wherein each inverter comprises a P-channel transistor and an N-channel transistor with their drain electrodes connected together.

8. A multivibrator comprising first and second inverters each comprising a pair of insulated gate field effect transistors, each inverter comprising a P-channel transistor and an N-channel transistor with their gates connected together and their drains connected together, means for coupling the source electrodes of each inverter across a power supply, and a single timing circuit for said multivibrator comprising a capacitor coupled between the drains of said second inverter and the gates of said first inverter and resistance means coupled between the gates and drains of said first inverter, and means for deriving a multivibrator output from the drain electrodes of one of said inverters.

9. A multivibrator according to claim 8 wherein said capacitor is formed by a piezoelectric crystal controlling the frequency of said multivibrator.

10. A multivibrator according to claim 8 wherein said resistance means includes a pair of oppositely poled rectifier diodes connected in parallel.

11. A multivibrator according to claim 10 including a separate resistor in series with each of said diodes.

12. A multivibrator according to claim 10 including a variable potentiometer connecting both of said diodes across the gate and drain electrodes of said first inverter.

13. A multivibrator comprising first and second inverters, each of said inverters comprising a pair of complementary transistors, means coupling the output of said first inverter to the input of said second inverter, means for coupling said inverters across a power supply, a single timing circuit for said multivibrator, said timing circuit comprising a capacitor coupled between the output of said second inverter and the input of said first inverter and resistance means including a parallel, a pair of oppositely poled rectifier diodes connected between the input and output of said first inverter, and means for deriving a multivibrator output from one of said inverters.

14. A multivibrator according to claim 13 including a variable resistor in series with each of said diodes.

15. A multivibrator comprising first and second inverters, each of said inverters comprising a pair of complementary transistors, means coupling the output of said first inverter to the input of said second inverter, means for coupling said inverters across a power supply, a capacitor coupling the output of said second inverter to the input of said first inverter, a resistor coupled between the input and the output of said first inverter, a piezoelectric crystal coupled to one of said inverters for controlling the frequency of said multivibrator, and means for deriving a multivibrator output from one of said inverters.

16. A multivibrator according to claim 15 wherein each inverter comprising P and N channel insulated gate field effect transistors, said crystal being coupled to the gate of both transistors in one of said inverters.

17. A multivibrator according to claim 16 wherein said crystal comprises a quartz crystal resonator connected between said gates and the source electrode of one of the transistors in said first inverter.

18. A multivibrator according to claim 16 wherein said crystal comprises a quartz crystal resonator connected between the output of said second inverter and the input of said first inverter, said capacitor being formed by the capacitance of said crystal.

UNITED STATES PATENT OFFICE

CERTIFICATE OF CORRECTION

Patent No. 3,568,091 Dated March 2, 1971

Inventor(s) Charles H. Rahe II

It is certified that error appears in the above-identified patent and that said Letters Patent are hereby corrected as shown below:

Column 2, line 61, "input signal" should read -- output signal --; line 70, after "inverter 14" insert -- is --. Colu line 2, "rail" should read -- drain --; line 32, "F" should r -- $\bar{F}$ --; line 68, "shorted "shorted" should read -- "shorted" Column 4, line 40, cancel "voltage", first occurrence; line 6 "Vn" should read -- constructed in --; line 67, after "timing insert -- circuit --. Column 5, line 50 (equation 10), the bracket sign should be added at the end of the equation, as follows:

$$T_o = RC\left[(1-K)\ln\left(\frac{2V_S - V_T}{V_S - V_T}\right) + K\ln\left(\frac{V_S + V_T}{V_T}\right)\right]$$

Column 6, line 10, "transistor" should read -- transition --; line 35, "quartz 92" should read -- quartz crystal 92 --; lin "vary" should read -- very --; line 61, "subharomonic" should read -- subharmonic --. Column 8, line 17 (claim 13) cancel tl comma after "parallel"; line 18, before "pair" cancel "a".

Signed and sealed this 9th day of November 1971.

(SEAL)
Attest:

EDWARD M.FLETCHER,JR.
Attesting Officer

ROBERT GOTTSCHALK
Acting Commissioner of Pate